(12) United States Patent
Fukazawa et al.

(10) Patent No.: US 6,842,530 B2
(45) Date of Patent: Jan. 11, 2005

(54) ELECTRIC ACOUSTIC CONVERTER HAVING A REAR SURFACE TERMINAL

(75) Inventors: Kenji Fukazawa, Saitama (JP); Tomohiko Kamimura, Habikino (JP); Satoru Fujiwara, Izumi (JP); Naoya Fujimoto, Yao (JP)

(73) Assignees: NEC Corporation, Tokyo (JP); Hosiden Corporation, Yao (JP)

( * ) Notice: Subject to any disclaimer, the term of this patent is extended or adjusted under 35 U.S.C. 154(b) by 589 days.

(21) Appl. No.: 09/874,115

(22) Filed: Jun. 6, 2001

(65) Prior Publication Data

US 2001/0053233 A1 Dec. 20, 2001

(30) Foreign Application Priority Data

Jun. 9, 2000 (JP) ........................................ 2000-173572

(51) Int. Cl.[7] .............................................. H04R 25/00

(52) U.S. Cl. ..................... 381/409; 381/386; 381/410
(58) Field of Search .................................. 381/417, 386,
381/394, 396, 409, 410, 412, 400, 398;
439/500, 626, 65, 66, 74

(56) References Cited

FOREIGN PATENT DOCUMENTS

| JP | 10-164693 | 6/1998 |
|----|-----------|--------|
| JP | 11-27777  | 1/1999 |
| JP | 11-355409 | 12/1999 |

*Primary Examiner*—Huyen D. Le
(74) *Attorney, Agent, or Firm*—Bacon & Thomas

(57) ABSTRACT

The present invention relates to an electric acoustic converter used as a speaker or a receiver of a mobile communication device such as a portable telephone or the like. In the electric acoustic converter according to the present invention, the size reduction and thinning of the thickness of the electric acoustic converter can be promoted by providing surface-like rear surface terminals 81 and 82 on the exposed surface 33 which is a rear surface of the yoke 3.

5 Claims, 16 Drawing Sheets

Fig. 6
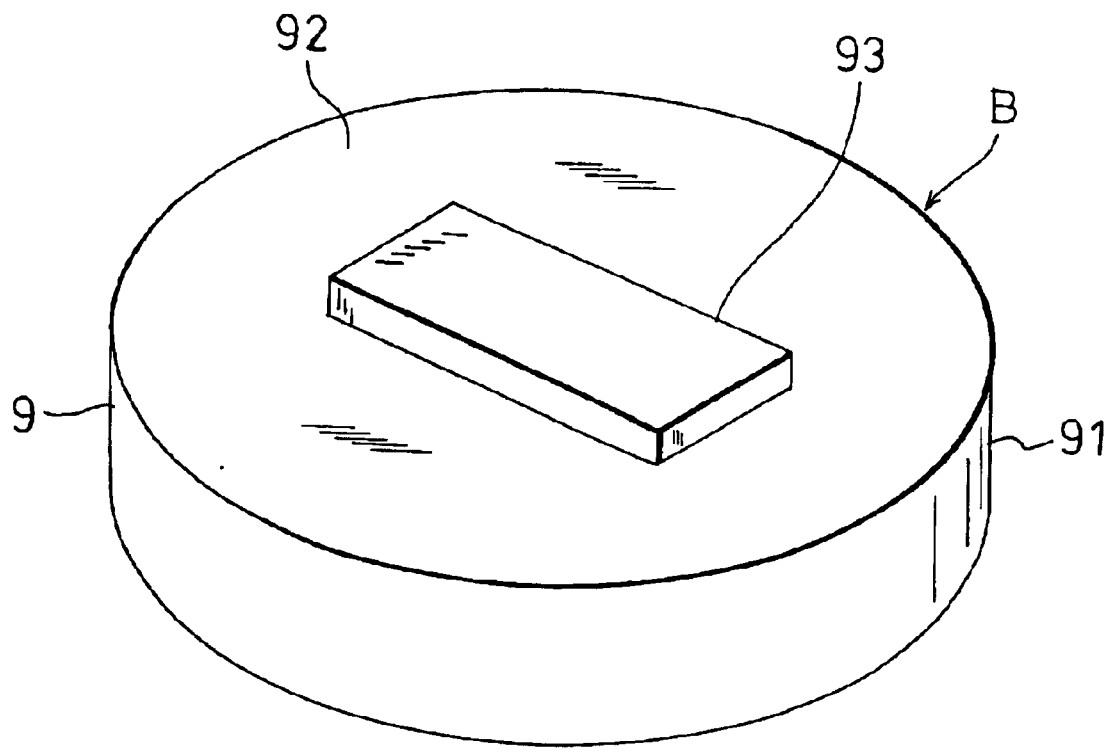
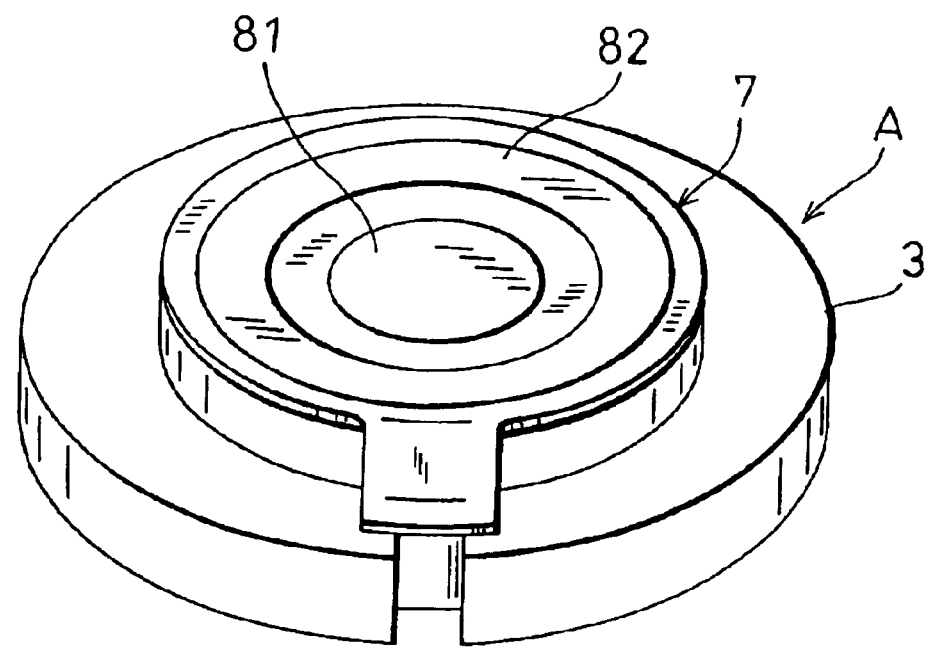

Fig. 9
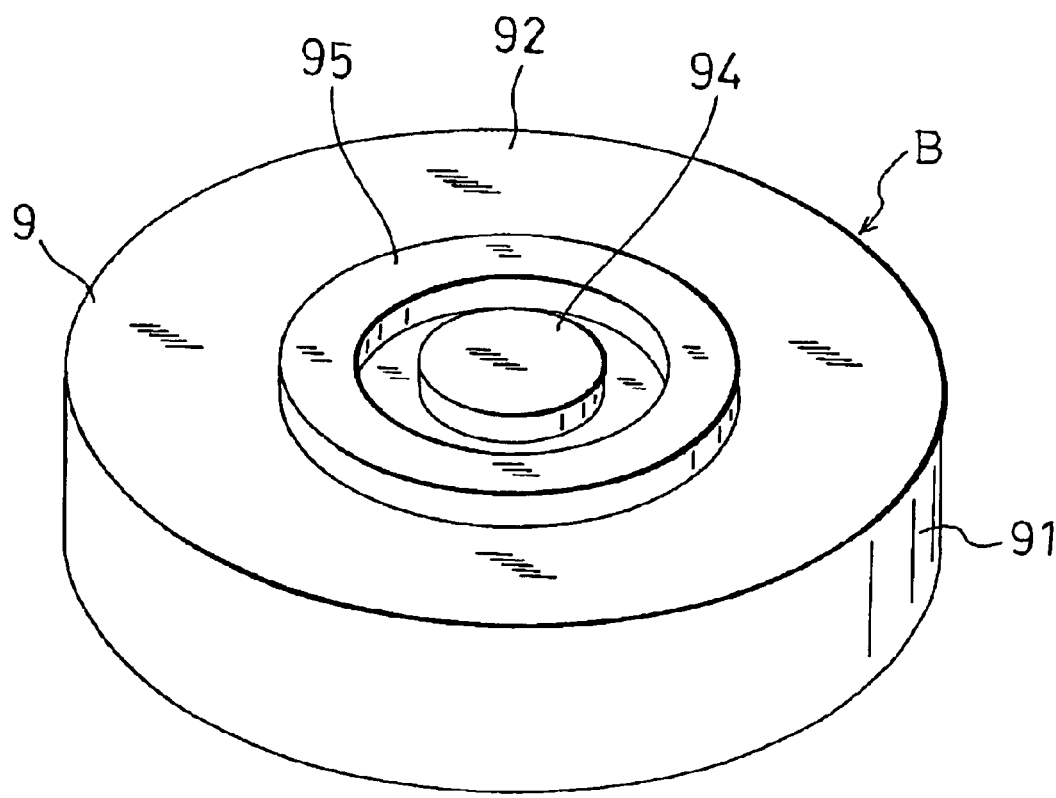
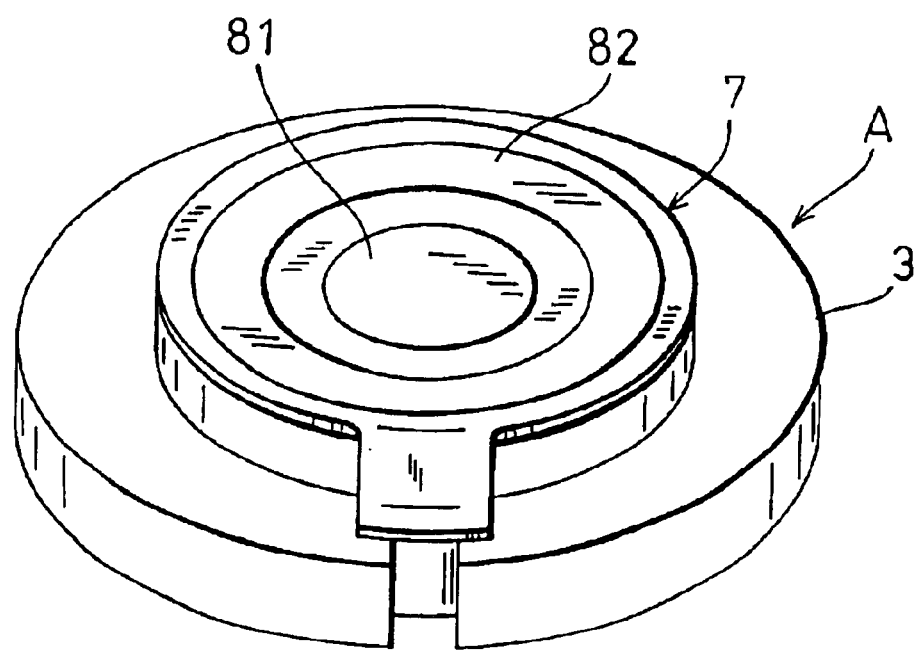

Fig. 10
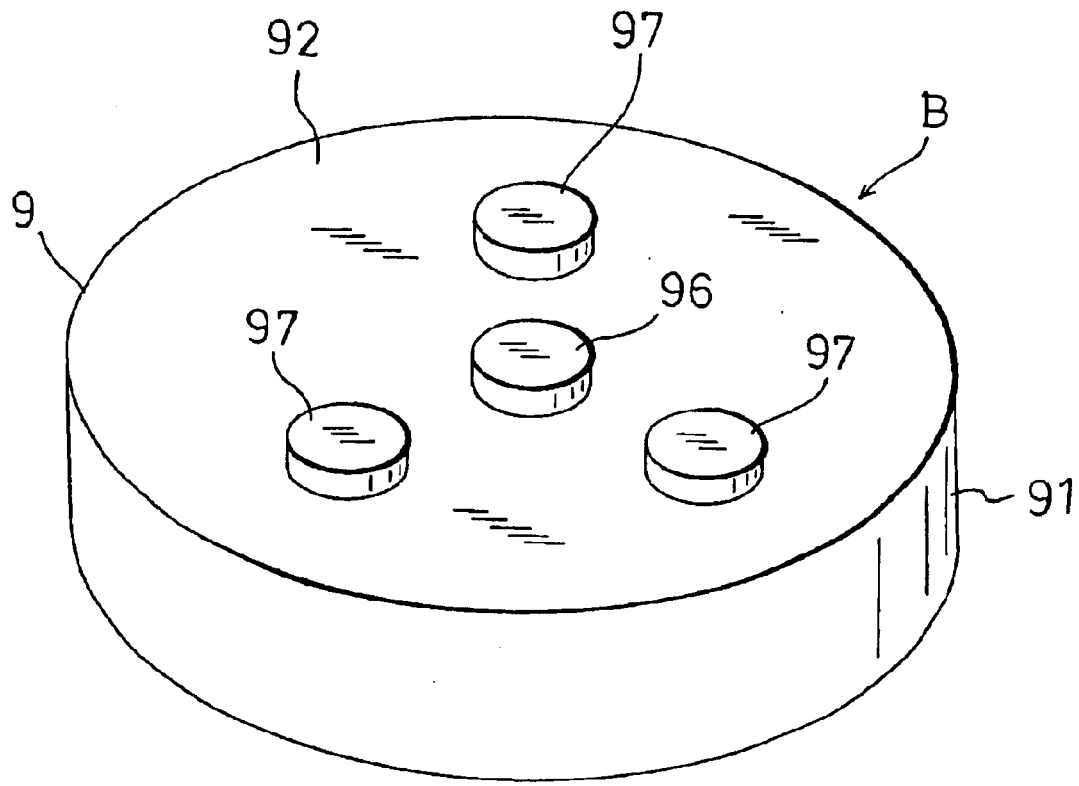
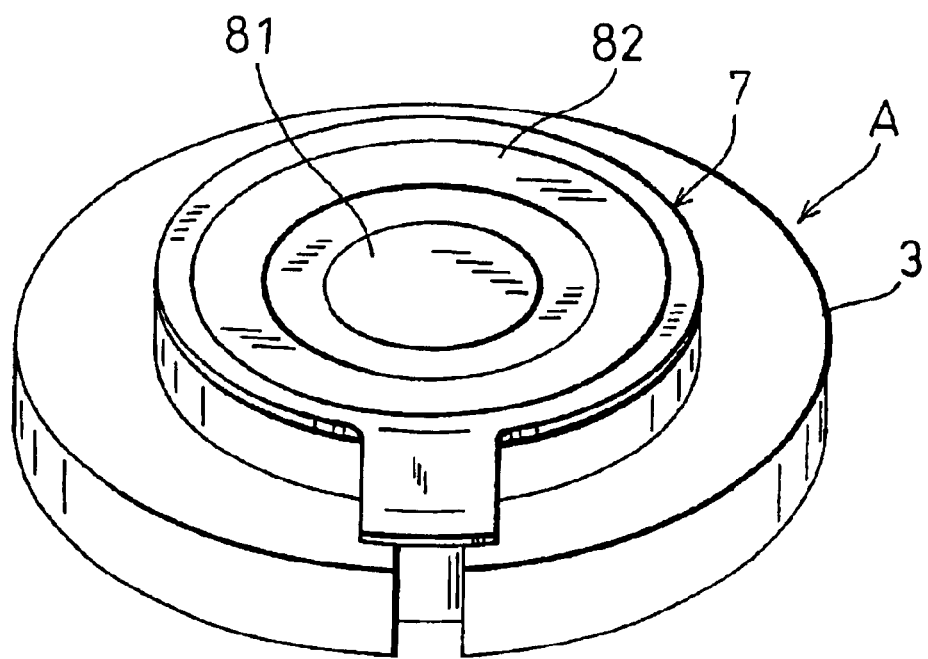

Fig. 11
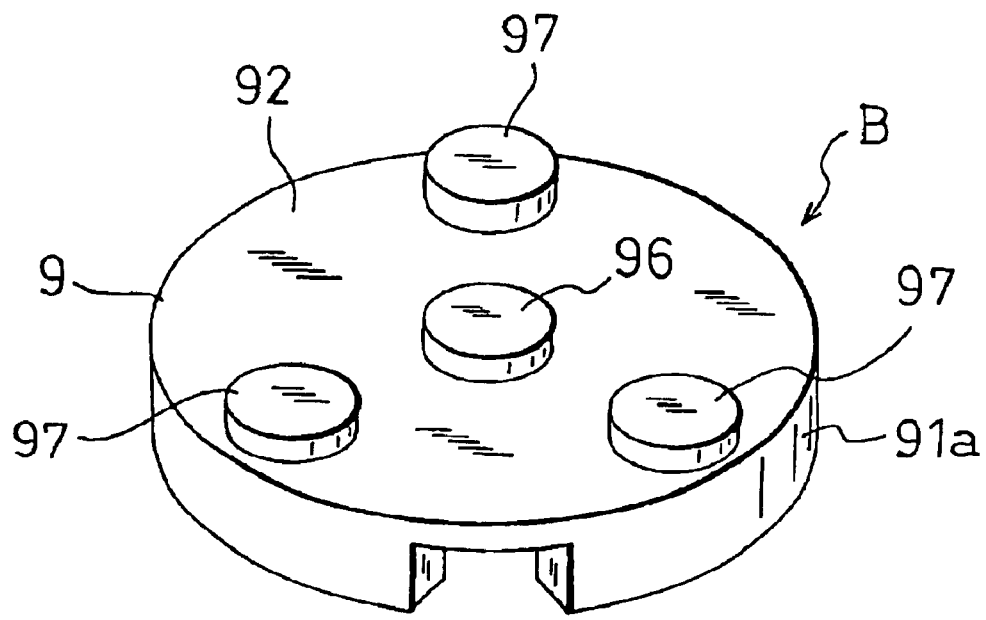
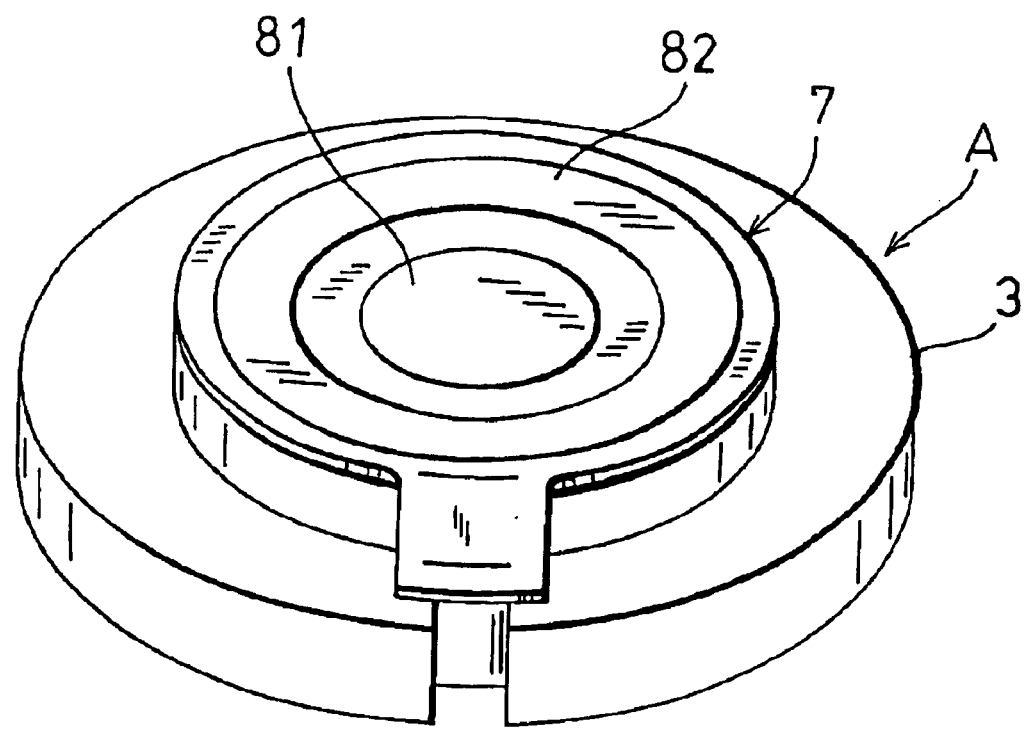

ELECTRIC ACOUSTIC CONVERTER HAVING A REAR SURFACE TERMINAL

BACKGROUND OF THE INVENTION

1. Field of the Invention

The present invention relates to electric acoustic converters, and more particularly to an electric acoustic converter having a rear surface terminal. The electric acoustic converter according to the present invention can be used not only as a speaker for a mobile communication device such as a portable telephone or the like but also as a receiver thereof.

2. Description of the Prior Art

In recent years, along with a size reduction and thinning of the thickness of mobile communication devices such as a portable telephone or the like, the size reduction and thinning of the thickness are apparently promoted with respect to the electric acoustic converter used in the speaker and the receiver of the communication device.

As this kind of electric acoustic converter, Japanese Patent Application Laying-Open No. 10-164693 discloses a dynamic type electric acoustic converter. According to the patent publication, two contact piece members formed of elastic material which is bent and processed are attached on the rear surface of the electric acoustic converter. An electrode on the connector side is allowed to elastically come into contact with each of the contact points of these contact piece members (first prior art example).

Furthermore, Japanese Patent Application Laying-Open No. 11-355409 describes a dynamic type receiver in which two surface electrodes are arranged in parallel at two eccentric portions of the rear surface of the receiver (second prior art example).

Still furthermore, Japanese Patent Application Laying-Open No. 11-27777 describes an electric acoustic converter in which a positive terminal is provided on a planar upper surface of a disc-type microphone while a negative terminal is provided on a ring-like upper end surface of a metal mesh surrounding the disc-type microphone (third prior art example).

However, in the first prior art example, since bent and processed elastic material is used for the contact piece member attached on the rear surface of the electric acoustic converter, a relatively large disparity is inevitably generated in the precision of the attachment position of the contact piece member. Then, because of such disparity in the precision of the attachment position, it is difficult to set to a definite size a vertical length from the front end surface (lower end surface) of the electric acoustic converter to the contact point of the contact piece member, namely, a height measurement of the electric acoustic converter including the contact piece member. As a consequence, it has been found that the relative position relation with the electrode on the connector side provided on the set of the communication device becomes difficult to be maintained on a definite level, and the contact point pressure between the contact point of the contact piece member and the electrode on the connector side becomes difficult to be maintained on a definite level.

Furthermore, in the second prior art example, since the two parallel surface electrodes are arranged at eccentric positions of the rear surface of the receiver, it becomes necessary to set at a high precision the position relations between the electrode on the connector side provided on the set side and the two surface electrodes on the receiver side at the time of assembling this receiver in the set of the communication device. Consequently, it has been found that a complicated positioning structure is compelled to be adopted to heighten the precision of the attachment position of the receiver with respect to the set of the communication device, which leads to an increase in the cost of the communication device.

Furthermore, in the third prior art example, it has been found n that the negative terminal is provided on a ring-like upper end surface of the metal shell surrounding the disc-type microphone so that the outer configuration of the microphone becomes large because of the metal shell.

SUMMARY OF THE INVENTION

The present invention has been made in the above circumstances. An object of the present invention is to provide an electric acoustic converter having a rear surface terminal, the converter facilitating a size reduction and thinning of the thickness.

Furthermore, an object of the present invention is to provide an electric acoustic converter having a rear surface terminal, the converter enabling setting at a high precision the height size to a definite level.

Furthermore, an object of the present invention is to provide an electric acoustic converter having a rear surface terminal, the converter enabling heightening the attachment characteristic to the communication device set by preventing the provision of directivity at the time of assembling the converter in the communication device set.

Furthermore, an object of the present invention is to provide an electric acoustic converter having a rear surface terminal, the converter enabling using a contact piece member formed of elastic material in the electrode on the contact side and using a conductive rubber in the electrode on the contact side.

By referring to the drawings, there will be explained an electric acoustic converter having a rear surface terminal according to the present invention. Incidentally, the use of symbols in the drawing is intended to facilitate the understanding of the content of the invention, and is not intended to limit the content of the invention to an example shown in the drawing.

The rear surface terminal of the electric acoustic converter (hereinafter simply referred to as "an electric acoustic converter") having a rear surface terminal according to the present invention is electrically connected to the end of the voice coil 6 inserted into the gap G inside of the magnetic circuit.

Then, this electric acoustic converter comprises a yoke 3 which serves as a constituent element of a magnetic circuit formed as an exposed surface 33 of a rear surface having at least a part exposed to the outside, and rear surface terminals 81 and 82 arranged at a plurality of locations of the exposed surface 33 to be electrically connected to the electrode on the connector side, the terminal being arranged at a plurality of locations of the exposed surface in the state in which the rear surface terminal is not extended out of the surface region of the exposed surface 33. In this electric acoustic converter, an electric signal with respect to the voice coil 6 is exchanged via the rear surface terminals 81 and 82, and an electrode on the side of the connector electrically connected to the rear surface terminals 81 and 82.

In the electric acoustic converter, the exposed surface 33 on which the rear surface terminals 81 and 82 are arranged may be formed of the overall surface of the rear surface of the yoke 3 but may be formed of a portion of the rear surface of the yoke 3. In any case, the rear surface terminals 81 and 82 are required to be arranged at a plurality of locations of the exposed surface 33 in the state in which the rear surface terminals 81 and 82 are not extended out of the surface region of the exposed surface 33. In such a structure, the rear surface terminals 81 and 82 are not extended out of the surface region of the exposed surface 33 and the outer configuration of the electric acoustic converter is not enlarged.

It is desirable that the rear surface terminals 81 and 82 are formed of surface electrode formed on the surface of the wiring substrate 7 overlapped on the exposed surface 33. In this structure, since the height position of the rear surface terminals 81, 82 on the exposed surface 33 is defined at a high precision in accordance with the thickness of the wiring substrate 7 with the result that the vertical length from the front end surface (lower end surface) of the electric acoustic converter to the rear surface terminals 81 and 82, namely the height size of the electric acoustic converter including the rear surface terminal is set to a definite level at a high precision. As a consequence, the relative relation with the electrode on the connector side provided on the set of the communication device is maintained at a definite level, and the contact point pressure between the rear surface terminals 81 and 82 and the electrode on the connector side.

In the electric acoustic converter according to the present invention, a recessed portion 35 located at a position lower than the exposed surface 33 is provided at the exposed surface 33 and at adjacent locations of the exposed surface 33 on the rear surface of the yoke 3. The above wiring substrate 7 is integrally provided with a projecting piece 72 arranged on the recessed surface 35, and a soldering lands 83 and 84 which is electrically short-circuited to the rear surface terminals 81 and 82 via the line connecting patterns 85 and 86 formed on the wiring substrate 7 are formed on the surface of this projecting piece 72. At the same time, it is desirable that the end of the voice coil 6 is soldered to the soldering lands 83 and 84. In such a structure, the soldered location at the end of the voice coil 6 is located on the soldered lands 83 and 84 provided on the recessed surface 35 at a position lower than the exposed surface 33 with the result that the soldered position is not projected above the exposed surface 33. As a consequence, the height size of the electric acoustic converter does not become longer than the vertical length from the front end surface (lower end surface) of the electric acoustic converter to the rear surface terminal which contributes to the suppression of the height of the electric acoustic converter and the promotion of the thinning thereof.

In the electric acoustic converter according to the present invention, it is desirable that the rear surface of the yoke 3 is formed into a flat surface circular configuration while the exposed surface 33 is sectioned and formed in the central portion of the rear surface while the recessed surface 35 is sectioned and formed in a ring-like configuration on the periphery of the exposed surface. In such a structure, it becomes possible to arrange the projecting portion 72 of the wiring substrate 7 having a soldering land at an arbitrary position on the recessed surface 35 located around the exposed surface 33. Consequently, the freedom degree becomes higher with respect to the set position of the projecting portion 72.

It is desirable that the electric acoustic converter according to the present invention has two rear surface terminals 81 and 82, and two soldering lands 83 and 84, and the line connecting patterns 85 and 86 short-circuiting the corresponding rear surface terminals 81 and 82 and the soldering lands 83 and 84 are formed on a rear surface of the wiring substrate 7 with the result that the rear surface of the wiring substrate 7 is joined via a sticking layer on the rear surface of the yoke 3. In such a structure, two rear surface terminals 81 and 82 and the two soldering lands 83 and 84 are electrically short-circuited with the line connecting patterns 85 and 86 on the side of the rear surface of the wiring substrate 7 with the result that it becomes possible to arbitrarily set the configuration of the two rear surface terminals 81 and 82 which requires to be mutually insulated.

It is desirable that in the electric acoustic converter according to the present invention, a plurality of the rear surface terminals 81 and 82 arranged respectively at a plurality of locations of the exposed surface 33 are formed of circular or circular ring-like surface electrodes which are mutually concentrically arranged. In such a structure, the plurality of the rear surface terminals 81 and 82 do not have any directivity with the result that the attachment characteristic at the time of assembling the electric acoustic converter into the set of the communication device can be enhanced while a structure for positioning the electric acoustic converter into the set of the communication device can be simplified.

In the electric acoustic converter according to the present invention, in the case where the rear surface terminals 81 and 82 are formed of surface electrodes formed on the surface of the wiring substrate 7 overlapping on the exposed surface 33 of the rear surface of the yoke 3, an electrode formed with the end surface of a conductive rubber can be adopted as the electrode on the side of the connector electrically connected to the rear surface terminal. In this case, the end surface of the conductive rubber may only be allowed to elastically come into contact with the rear surface terminal. Furthermore, in the above case, it is also possible to adopt an electrode formed of a contact point provided on the contact piece member as the electrode on the side of the connector. In this case as well, the contact point may only be allowed to elastically come into contact with the rear surface terminal.

As has been described above, according to the present invention, since the rear surface terminal is provided on the rear surface of the yoke in a configuration that the rear surface terminal is not extended out of the surface area of the rear surface, the size reduction and thinning of the thickness of the electric acoustic converter can be facilitated. Furthermore, in the electric acoustic converter which is provided on the surface of the wiring substrate having the rear surface terminal overlapped on the rear surface of the yoke, the height size of the electric acoustic converter is set to a definite level at a high precision which contributes toward heightening the contact stability by setting the contact point pressure between the electrode on the side of the connector and it. Furthermore, in the electric acoustic converter in which a plurality of rear surface terminals are mutually concentrically provided, a directivity at the time of assembling the converter into a set of the communication device is lost, so that the attachment characteristic to the communication device set is heightened. In addition, a conductive rubber is used in the electrode on the side of the connector and the contact piece member which is formed of elastic member and a contact piece member which is elastically energized with the elastic member can be used in the electrode on the side of the connector with the result that the freedom degree of the assemblage with the electrode on the side of the connector can be heightened.

Incidentally, it goes without saying that the electric acoustic converter according to the present invention can be used as a speaker, and the converter can be used as a receiver as well.

BRIEF DESCRIPTION OF THE DRAWINGS

FIG. 6 is a broken perspective view showing the electric acoustic converter and a connector;

FIG. 9 is a broken perspective view showing the electric acoustic converter and another connector;

FIG. 10 is a broken perspective view showing the electric acoustic converter and still another connector;

FIG. 11 is a broken perspective view showing the electric acoustic converter and still another connector;

DETAILED DESCRIPTION OF THE PREFERRED EMBODIMENTS

An electric acoustic converter according to an embodiment of the present invention will be explained by referring to FIGS. 1 through 5.

Figure 1:
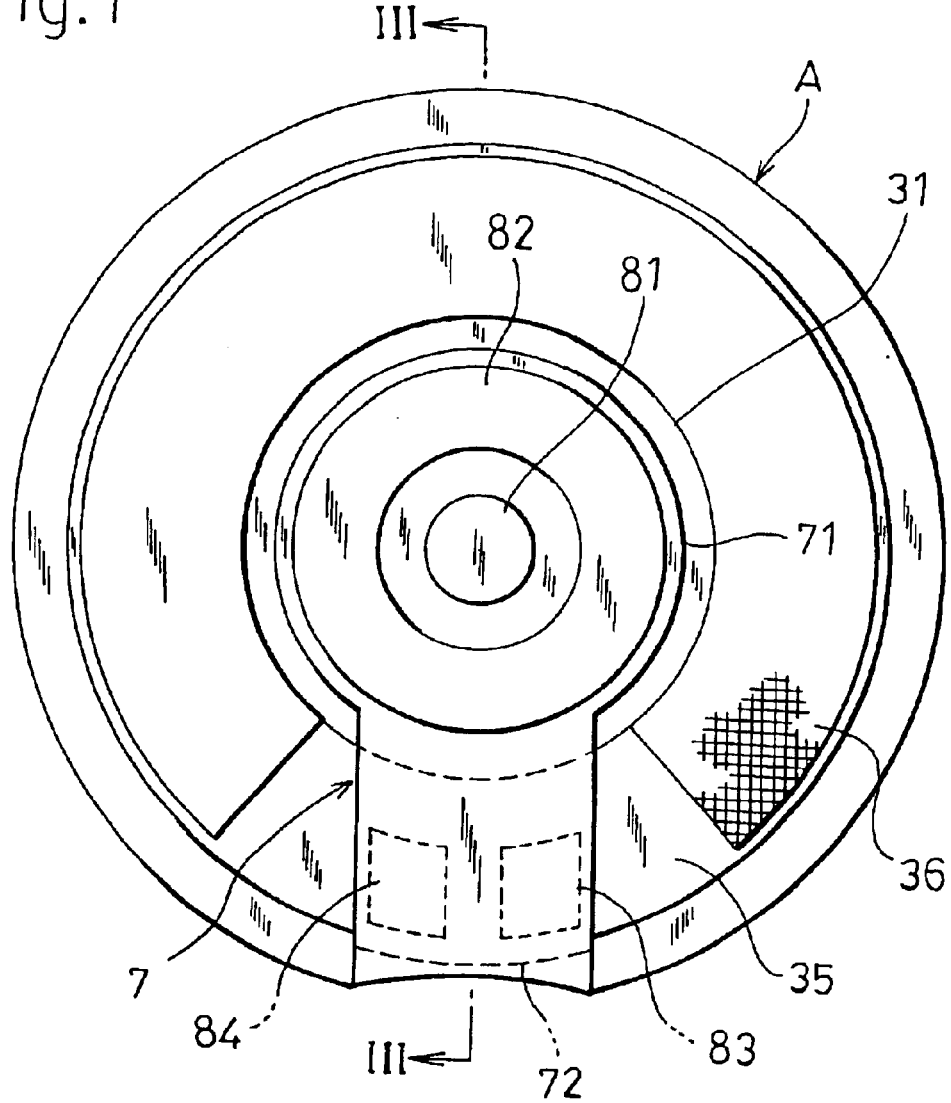
FIG. 1 is a schematic plan view showing an electric acoustic converter according to an embodiment of the present invention.
Figure 2:
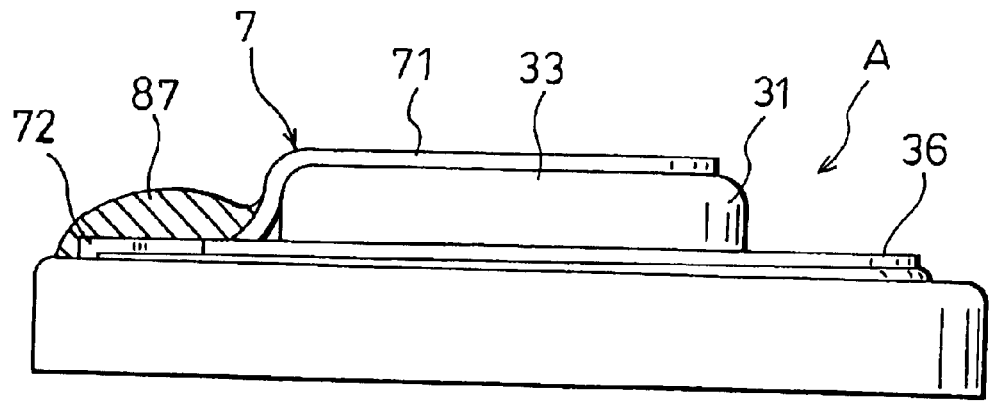
FIG. 2 is a schematic side view showing in a broken state a portion of the electric acoustic converter of FIG. 1.
Figure 3:
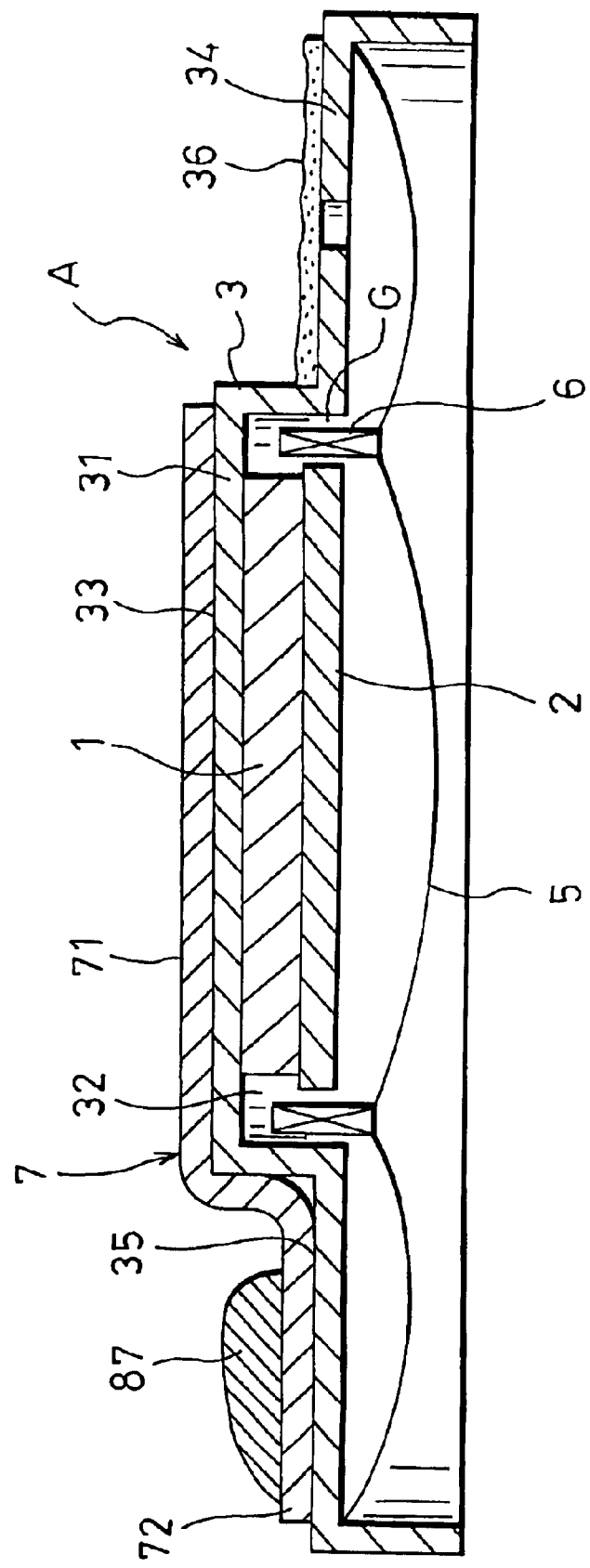
FIG. 3 is an enlarged schematic sectional view showing a portion taken along line III—III of FIG. 1.

As shown in FIG. 3, an electric acoustic converter A shown as an example in the drawing is of a dynamic type, and comprises a magnet 1, a pole piece 2, a flat circle-shaped yoke 3, a vibration plate 5 and a voice coil 6 provided on the vibration plate 5. As shown in FIGS. 1 through 3, a flat circle-shaped projection portion 31 is provided on the central portion of the yoke 3. In a recessed portion 32 inside of the projection portion 31, the magnet 1 and the pole piece 2 are accommodated. A magnetic circuit constituent element of the electric acoustic converter A includes the above magnet 1, the pole piece 2 and the yoke 3, and the voice coil 6 is inserted into a gap G of the magnetic circuit comprising the magnet 1, the pole piece 2 and the yoke 3.

An upper surface of the projection portion 31 of the above yoke 3 is formed as an exposed surface 33 exposed to the outside while an upper surface of a circular ring-like portion 34 around the projection portion 31 is formed as a recessed surface 35 located at a lower position than the exposed surface 33. Consequently, a rear surface of the yoke 3 is partitioned into an exposed surface 33 of the central portion and a recessed surface 35 located at a position lower than the exposed surface 33 adjacent to the exposed surface 33. Then, only a portion of the recessed surface 35 is exposed while a cloth 36 is plastered on the other portion.

Figure 4:
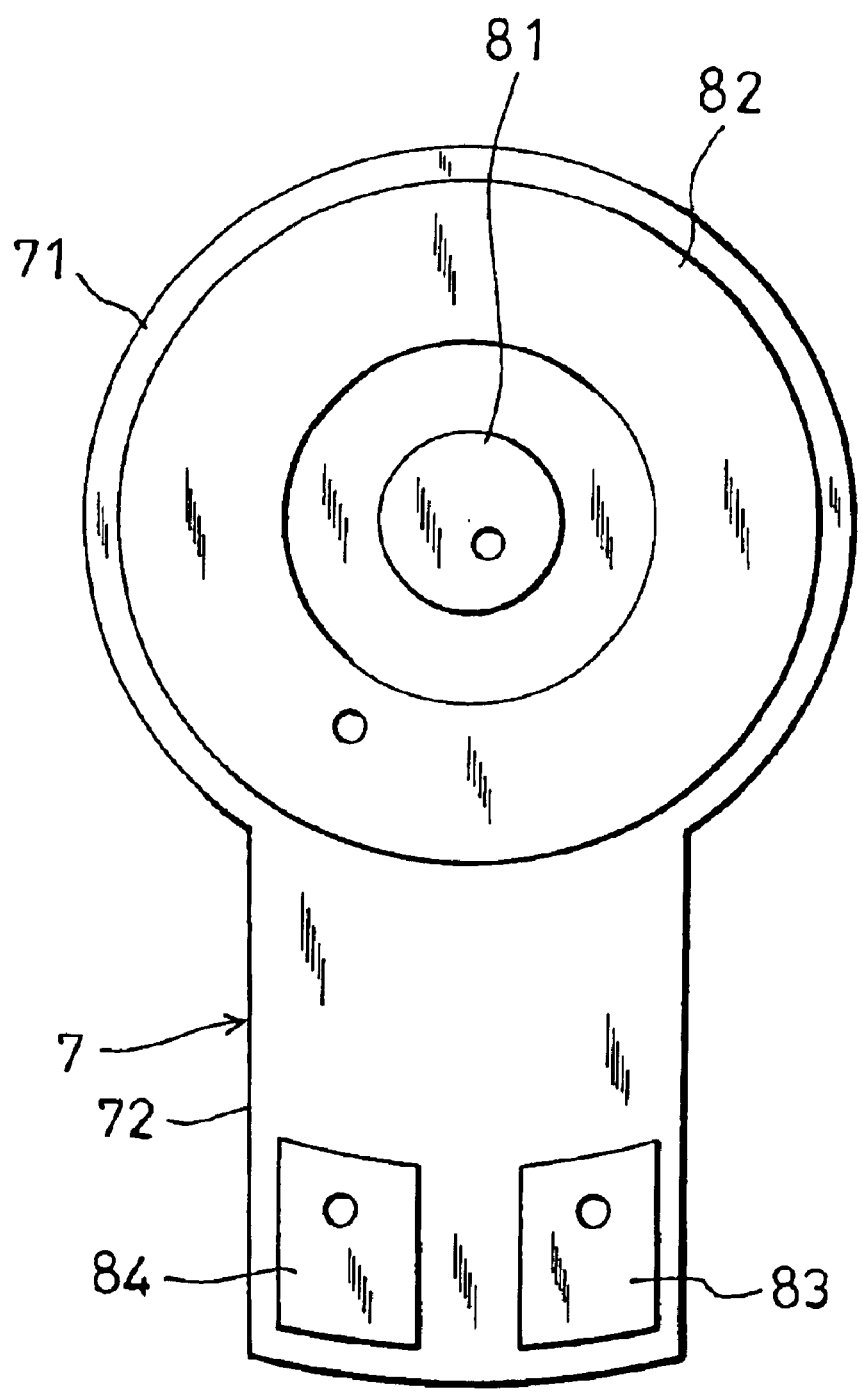
FIG. 4 is a plan view showing a surface of the wiring substrate.
Figure 5:
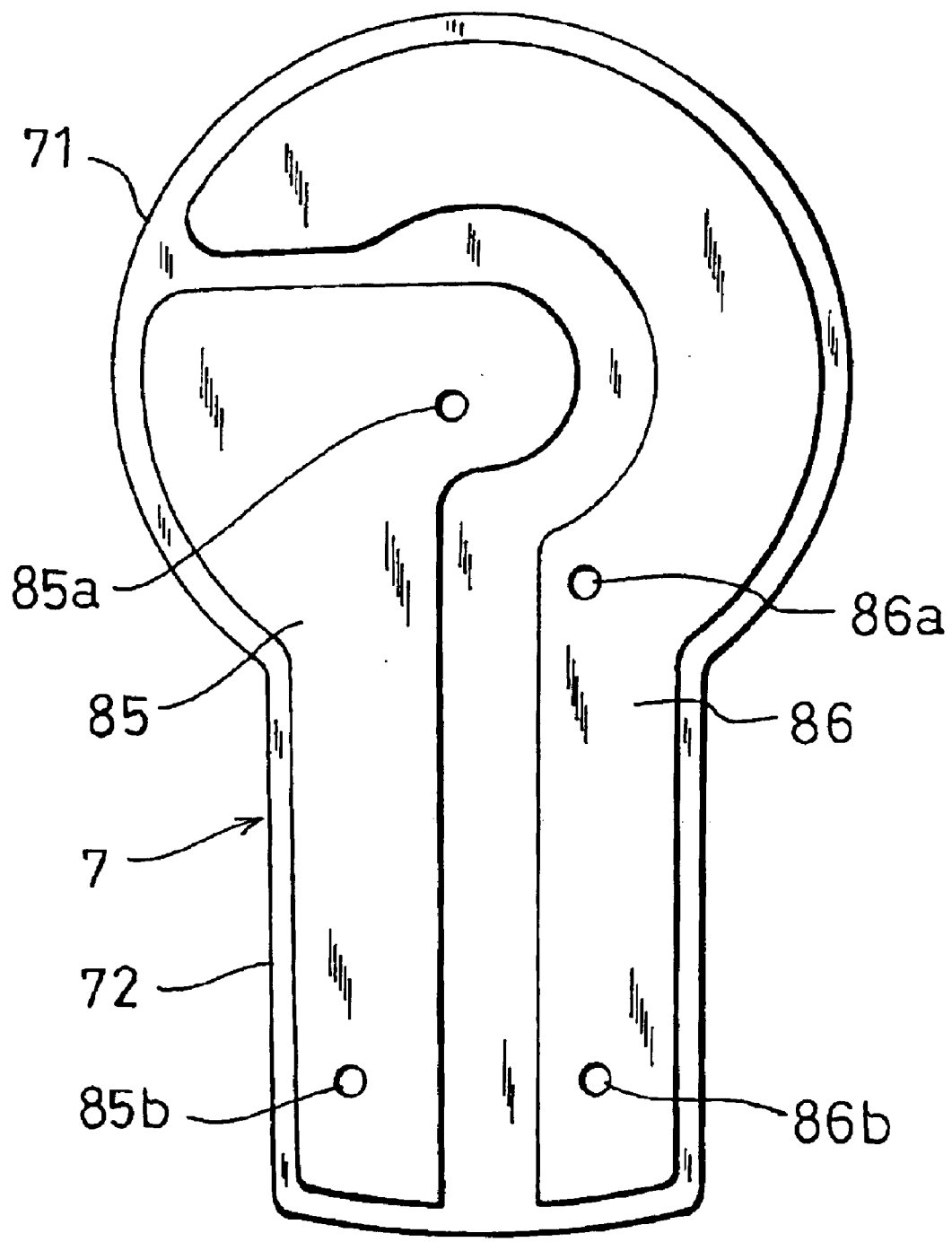
FIG. 5 is a plan view showing a rear surface of the wiring substrate.

Over the exposed surface 33 and the exposed portion of the recessed surface 35, a flexible wiring substrate (hereinafter referred to as "FPC") 7 is formed. As shown in FIGS. 4 and 5, the FPC 7 integrally comprises a circle-shaped portion 71, and an approximately rectangular projecting portion 72 which protrudes from a circumferential portion of the circle-shaped portion 71. Then, as shown in FIG. 4, a circle-shaped rear surface terminal 81 is formed in the center of the surface of the circle-shaped portion 71 while a different rear surface terminal 82 having a circular ring-like configuration is concentrically formed around the rear surface terminal 81. In contrast, two soldering lands 83 and 84 are formed on the surface of the end portion of the projecting piece portion 72. Furthermore, as shown in FIG. 5, the two systems of line connection patterns 85 and 86 are formed on the rear surface of the FPC 7 from the circle-shaped portion 71 to the projecting piece portion 72 with the result that one end portion of the line connection pattern 85 on one side and the other end portion thereof are electrically connected to the central rear surface terminal 81 and the soldering land 83 on the one side via the through holes 85a and 85b respectively while one end portion and the other end portion of the line connection pattern 86 on the other side are electrically connected to the other rear surface terminal 82 and the soldering land 84 on the other side via the through holes 86a and 86b respectively.

In the FPC 7 shown in FIGS. 4 and 5, two rear surface terminals 81 and 82 formed on the rear surface of the circle-shaped portion 71 and the soldering lands 83 and 84 formed on the surface of the projecting piece portion 72 are formed of a surface electrode formed of a good conductor such as gold plating foil or the like.

As shown in FIGS. 1 through 3, the above FPC 7 is such that the circle-shaped portion 71 is overlapped on the circular exposed portion 33 of the yoke 3, and the projecting piece portion 72 is overlapped on the exposed portion of the recessed surface 35 of the yoke 3. Furthermore, the stem portion of the projecting piece portion 72 is bent in a configuration along the step at the boundary between the projection portion 31 and the circular ring portion 34. Here, on the rear surface of the FPC 7, an electric insulation layer covering the line connection patterns 85 and 86 are formed. Furthermore, as means for fixing the FPC 7 to the yoke 3, a heating pressure type both side sticking tape is used. With the sticking layer of the both side sticking tape, the FPC 7 and the yoke 3 are joined. Furthermore, the circle-shaped portion 71 of the FPC 7 has a size of not extending out of the exposed surface 33. Consequently, the two rear surface terminals 81 and 82 are also arranged on the exposed surface 33 in the state in which the two rear surface terminals 81 and 82 are not extended out from the surface area of the exposed surface 33 to be arranged on the exposed surface 33.

On the above two soldering lands 83 and 84, two ends of the coil line of the voice coil 6 are respectively soldered to be electrically connected. In FIGS. 2 and 3, reference numeral 87 denotes a soldering location thereof. A tip portion of the soldering location 87 is located at a position lower than the above exposed surface 33. Incidentally, the routing structure which is adopted for pulling out to the outside of the yoke 3 the end of the coil line of the voice coil 6 is known, so that the drawing thereof is omitted.

According to the electric acoustic converter A explained above, the two rear surface terminals 81 and 82 are arranged at two locations of the exposed surface 33 in the state in which the rear surface terminals 81 and 82 are not exposed from the surface area of the exposed surface 33 formed of a part of the rear surface of the yoke 3. As a consequence, the rear surface terminals 81 and 82 thereof are formed of a surface electrode formed on the surface of the circle-shaped portion 71 of the FPC 7 overlapped on the exposed surface 33. Consequently, the outer size of the electric acoustic converter A becomes equal to the outer size of the yoke 3 at most. The height size thereof is no more than the size wherein the thickness of FPC 7 including the rear surface terminals 81 and 82 is added to the height of the yoke 3. Furthermore, since the vertical length between the lower end of the yoke 3 and the rear surface terminals 81 and 82 are set to the same level, the relative position relation between the electrode (not shown) on the side of the connector of the communication device set and the rear surface terminals 81 and 82 are maintained at a definite level, and the contact point pressure can be easily set to a definite level.

Furthermore, since the rear surface terminals 81 and 82 are formed of mutually concentrically arranged circular or circular ring-like surface electrode, these rear surface terminals 81 and 82 do not have a directivity. As a consequence, the attachment characteristic at the time of assembling the electric acoustic converter A into the set of the communication device is heightened with the result that it becomes possible to simplify a structure of positioning the electric acoustic converter A into the set of the communication device.

In the electric acoustic converter A according to the embodiment explained above, two rear surface terminals 81 and 82 are provided, but the number of the rear surface terminals 81 and 82 are not limited to two.

Figure 7:
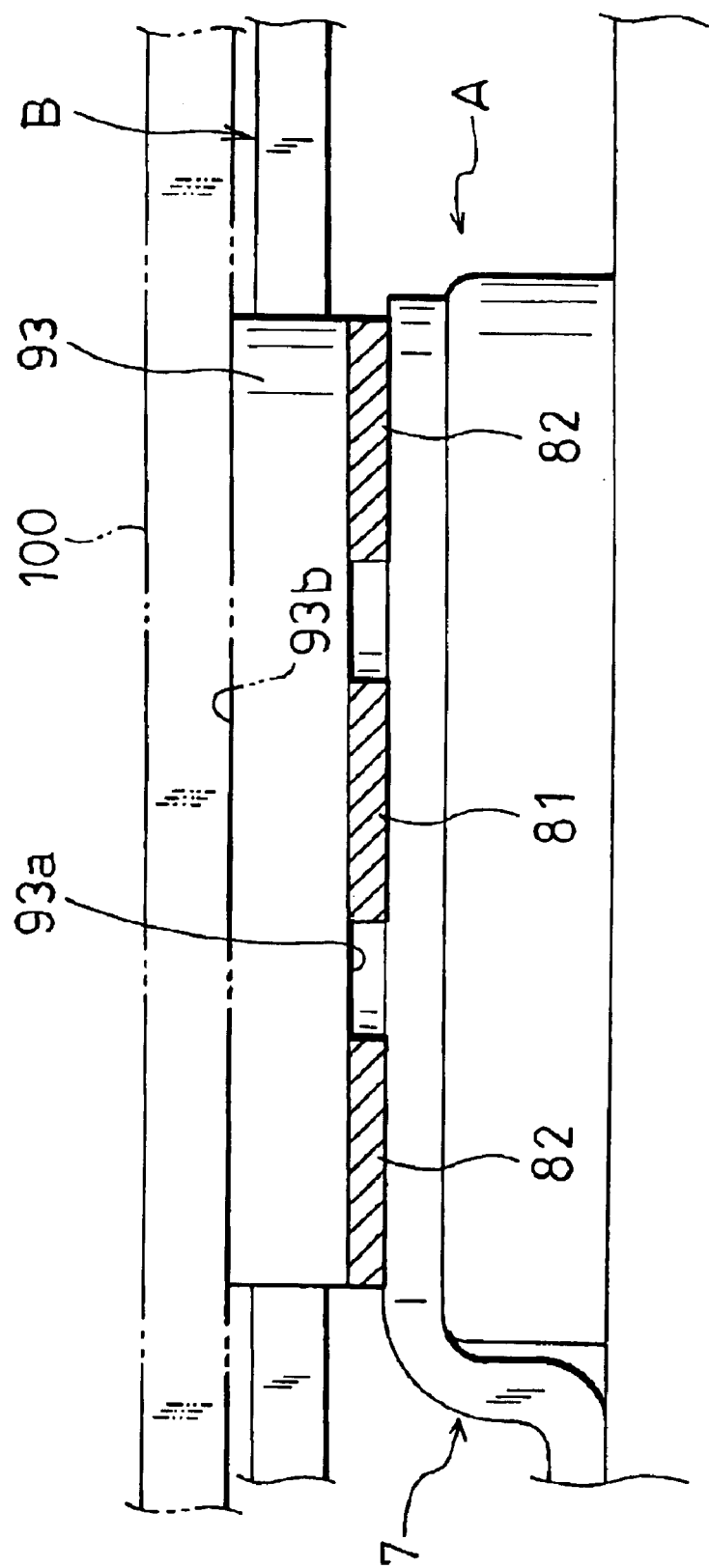
FIG. 7 is a view for explaining an essential portion, the view showing an assemblage state of the electric acoustic converter and the connector.
Figure 8:
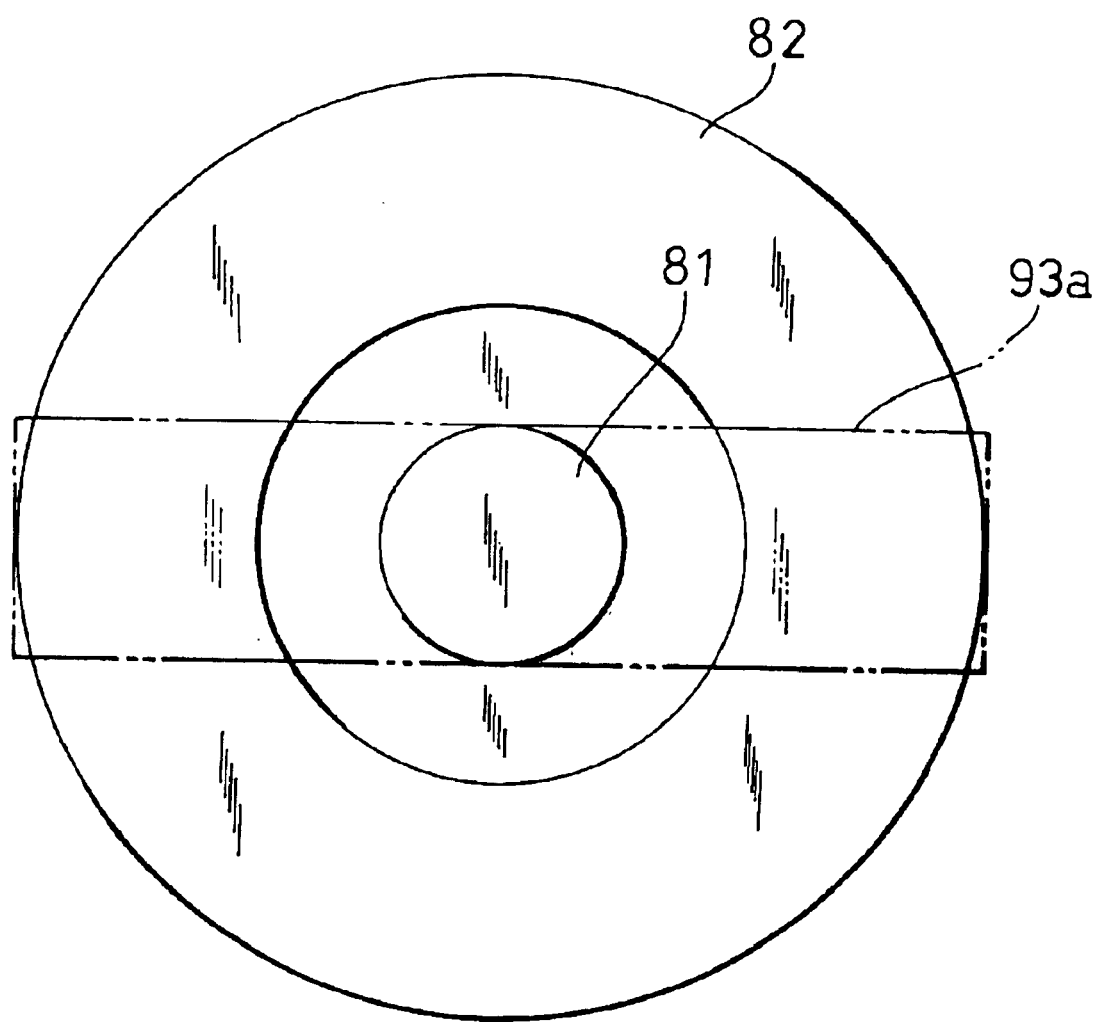
FIG. 8 is a view for explaining a contact state of the rear surface terminal and the electrode on the side of the connector.

FIG. 6 is a broken perspective view showing the electric acoustic converter A and the connector B used in the electric acoustic converter A. FIG. 7 is a view for explaining an essential portion, the view showing the assemblage state of the converter and the connector. FIG. 8 is a view for explaining the contact state between the rear surface terminals 81 and 82 and the electrode 93a on the side of the connector.

The connector B shown in FIG. 6 allows the upper plate 92 of the case 9 having a peripheral wall 91 that can be fit into the outer periphery portion of the yoke 3 of the electric acoustic converter A to hold the conductive rubber 93 in the form of projecting to both sides above and below the upper plate portion 92 on the upper plate portion 92, so that the lower end surface and the upper end surface of the conductive rubber 93 are formed as electrodes 93a and 93b. Incidentally, in the conductive rubber 93, an electric channel is arranged in the direction of thickness.

The connector B is attached on the electric acoustic converter A by fitting the peripheral wall 91 of the case 9 on the outer periphery portion of the yoke 3. When the connector B is attached on the electric acoustic converter A in this manner, the electrode 93a formed with the lower end surface of the conductive rubber 93 as shown as an example in FIG. 7 elastically comes into contact over the two rear surface terminals 81 and 82. In the conductive rubber 93 in this case, since an electric channel is arranged in a direction of thickness, the two rear surface terminals 81 and 82 are not short-circuited with the conductive rubber 93. Furthermore, when the case 9 is attached on the set of communication device such as the mobile telephone or the like, the electrode pattern formed on the wiring substrate 100 on the side of the communication device elastically comes into contact with the electrode 93b formed with the upper end surface of the conductive rubber 93. Then, as can be assumed from FIG. 8, since the two rear surface terminals 81 and 82 of the electric acoustic converter A are concentrically arranged, the same connection state can be obtained in the case where the electrode 93a on the side of the conductive rubber runs over the two rear surface terminals 81 and 82 in a horizontal direction as shown in the drawing and in the case where the rear surface terminals are set in other states not shown, for example, in the state in which the two rear surface electrodes 93a are diagonally inclined or run in a vertical direction. Consequently, a directivity is lost in the position relations between the two rear surface terminals 81 and 82 of the electric acoustic converter A and the electrode 93a of the conductive rubber 93.

FIG. 9 is a broken perspective view showing the electric acoustic converter A and the other connector B used in assemblage with the electric acoustic converter A.

The connector B of FIG. 9 allows the outer plate 92 of case 9 having a peripheral wall 91 that can be fit into the outer periphery portion of the yoke 3 of the electric acoustic converter A to hold the column-like conductive rubber 94 in the form of projecting to both sides above and below the upper plate portion 92 on the upper plate portion 92 and a cylindrical conductive rubber 95 arranged at a position concentric with the rubber 94, so that the lower end surface and the upper end surface of the conductive rubbers 94 and 95 are formed as electrodes. Furthermore, the column-like conductive rubber 94 has a diameter approximately equal to a circular rear surface terminal 81. The column-like conductive rubber 95 has an inner periphery diameter and an outer periphery diameter approximately equal to the rear surface terminal 82 of the circular ring-like configuration.

The connector B of FIG. 9 is attached to the electric acoustic converter A by fitting the peripheral wall 91 of the case 9 into the outer periphery portion of the yoke 3. When the connector B is attached on the electric acoustic converter A, the electrode on the lower end surface of the column-like conductive rubber 94 elastically comes into contact with the circular-shaped rear surface terminal 81 while electrode on the lower end surface of the cylindrical conductive rubber 95 elastically comes into contact with the circular ring-like rear surface terminal 82. In this case as well, a directivity is lost in the position relation between two rear surface terminals 81 and 82 of the electric acoustic converter A and respective electrodes of the two conductive rubbers 94 and 95.

FIG. 10 is a broken perspective view showing the above electric acoustic converter A and still another connector B used in assemblage in the electric acoustic converter A.

The connector B of FIG. 10 allows the upper plate portion 92 of the case 9 having a peripheral wall 91 that can be fit into the outer periphery portion of the yoke 3 of the electric acoustic converter A to hold one column-like conductive rubber 96 in the form of projecting to both sides above and below the upper plate portion 92 and three column-like conductive rubber 97 arranged at three locations on the periphery thereof, so that the lower end surface and the upper end surface of the conductive rubbers 96 and 97 are formed as electrodes.

The connector B of FIG. 10 is attached on the electric acoustic converter A by fitting the peripheral wall 91 of the case 9 on the outer periphery portion of the yoke 3 of the electric acoustic converter A. When the connector B is attached on the electric acoustic converter A in this manner, the electrode on the lower end surface of the central column-like conductive rubber 96 elastically comes into contact with the circular rear surface terminal 81, and the electrode on the lower end surface of the three column-like conductive rubbers 97 elastically come into contact with the circular ring-like rear surface terminal 82. In this case as well, a directivity is lost in a position relation between the two rear surface terminals 81 and 82 of the electric acoustic converter A and respective electrodes of the two conductive rubbers 96 and 97.

FIG. 11 is a broken perspective view showing the electric acoustic converter A and still another connector B used in assemblage with the converter A.

The connector B of FIG. 11 allows the upper plate portion 92 of the case 9 having a peripheral wall 91a that can be fit into the outer periphery portion of the projection portion 31 of the yoke 3 of the electric acoustic converter A to hold one column-like conductive rubber 96 in the form of projecting to both sides above and below the upper plate portion 92 and three column-like conductive rubbers 97 arranged at three locations on the periphery, so that the lower end surface and the upper end surface of these conductive rubbers 96 and 97 are formed as electrodes.

The connector B of FIG. 11 is attached on the electric acoustic converter A by fitting the peripheral wall 91 of the case 9 on the outer periphery portion of the projection portion 31 of the yoke 3. When the connector B is attached on the electric acoustic converter A in this manner, the electrode on the lower end surface of the central column-like conductive rubber 96 elastically comes into contact with the circular rear surface terminal 81, and the electrode on the lower end surface of the three column-like conductive rubbers 97 elastically comes into contact with the circular ring-like rear surface terminal 82. In this case as well, a directivity is lost in a position relation between respective electrodes of two rear surface terminals 81 and 82 of the electric acoustic converter A and respective electrodes of two conductive rubbers 96 and 97.

Figure 12:
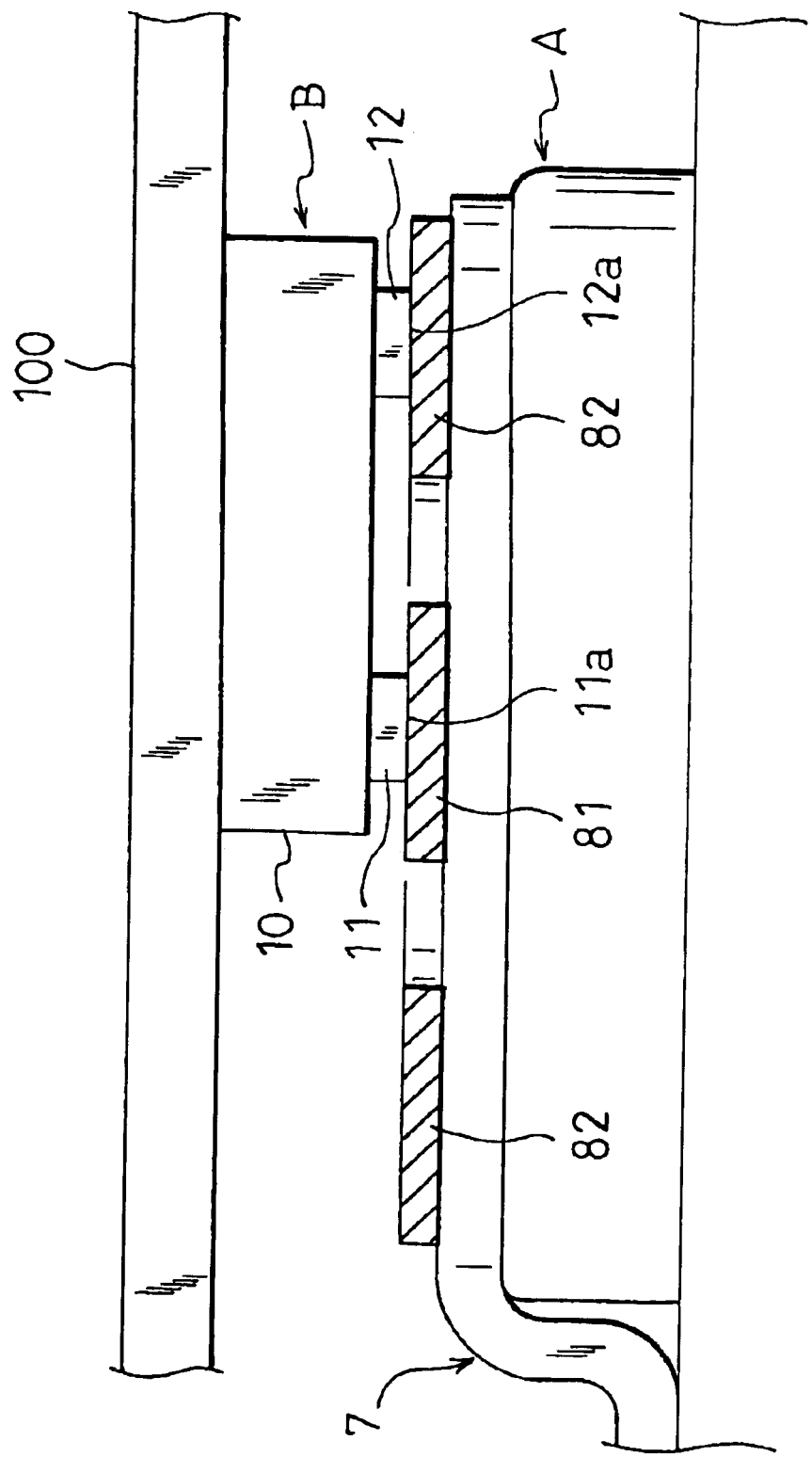
FIG. 12 is a schematic side view showing in a partially broken state a portion of the electric acoustic converter and still another connector.
Figure 13:
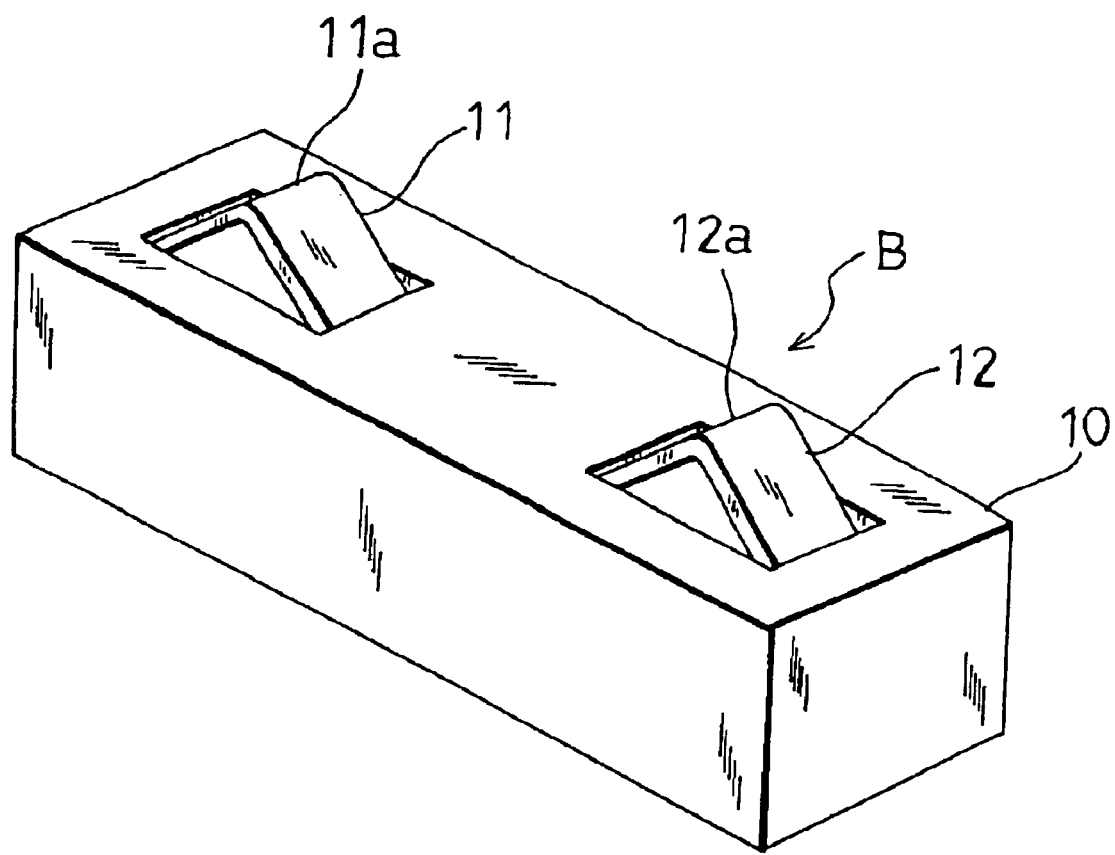
FIG. 13 is a schematic perspective view showing the connector of FIG. 12 as seen diagonally from below.

FIG. 12 is a schematic side view showing in partially broken state the electric acoustic converter A and still another connector B used in assemblage with the converter A. FIG. 13 is a schematic perspective view showing the connector B as diagonally seen from below.

The connector B of FIG. 13 allows the contact piece members 11 and 12 comprising a plate spring to be projected at two locations of a box case 10, so that the contact points provided on these contact piece members 11 and 12 are formed as electrodes 11a and 12a. The connector B allows the electrodes 11a and 12a to elastically come into contact with the two rear surface terminals 81 and 82 respectively as shown in FIG. 12 in the state in which the connector B is mounted on the wiring substrate 100 on the side of the set of the communication device. In this case as well, a directivity is lost in the position relation between the two rear surface terminals 81 and 82 of the electric acoustic converter A and two electrodes 11a and 12a.

Figure 14:
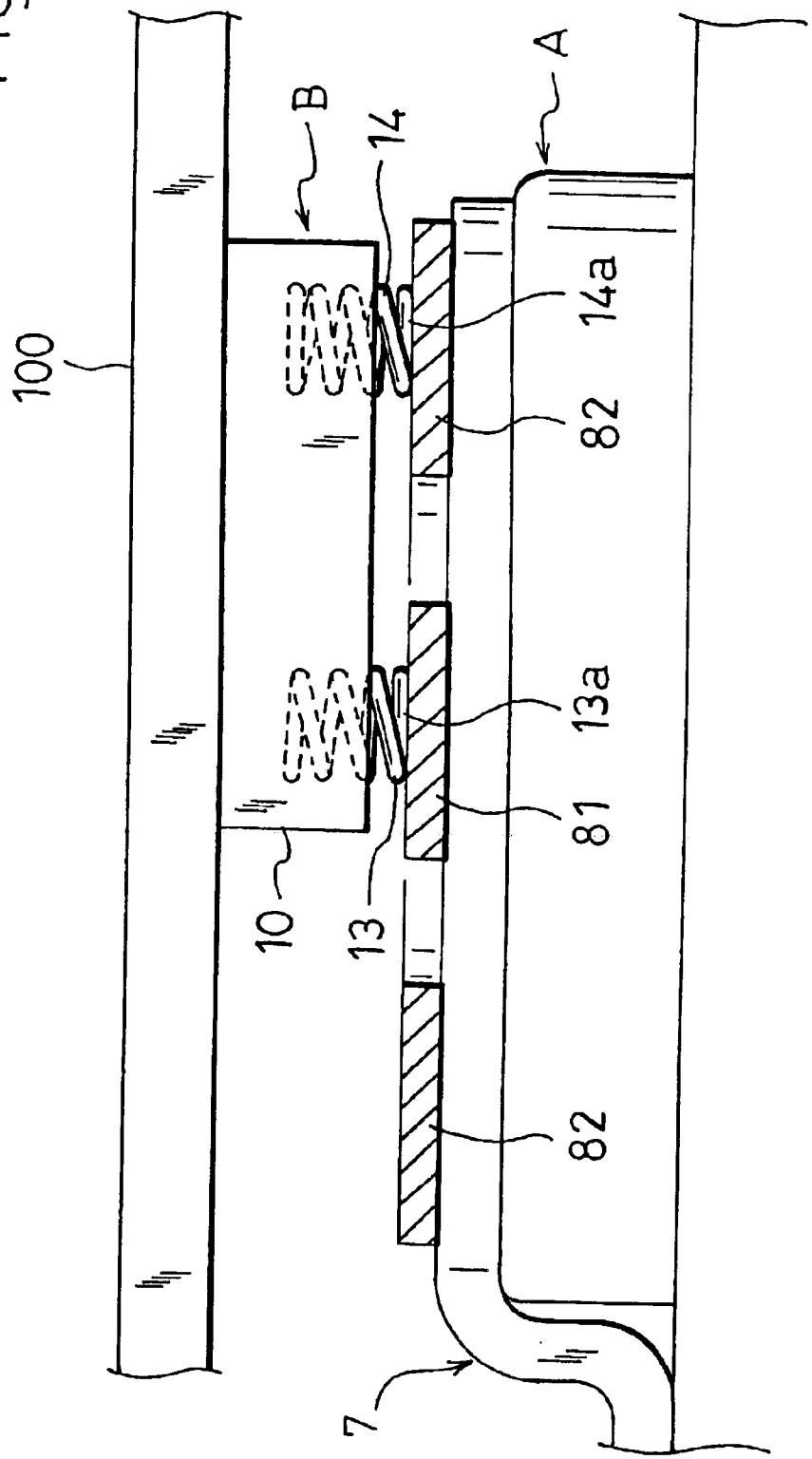
FIG. 14 is a schematic side view showing in a partially broken state the electric acoustic converter and still another connector.

FIG. 14 is a schematic side view showing in a partially broken state the electric acoustic converter A and still another connector B used in assemblage in the converter A.

The connector B of FIG. 14 allows the contact piece members 13 and 14 comprising a coil spring to be projected at two locations of the box case 10, and contacts points provided at the end of these contact piece members 13 and 14 are formed as electrodes 13a and 14a. This connector B allows the electrodes 13a and 14a to elastically come into contact with two rear surface terminals 81 and 82 as shown in FIG. 14 in the state in which the connector B is attached on the wiring substrate 100 on the side of the set of the communication device. In this case as well, a directivity is lost in the position relation between the two rear surface terminals 81 and 82 of the electric acoustic converter A and the two electrodes 13a and 14a.

Figure 15:
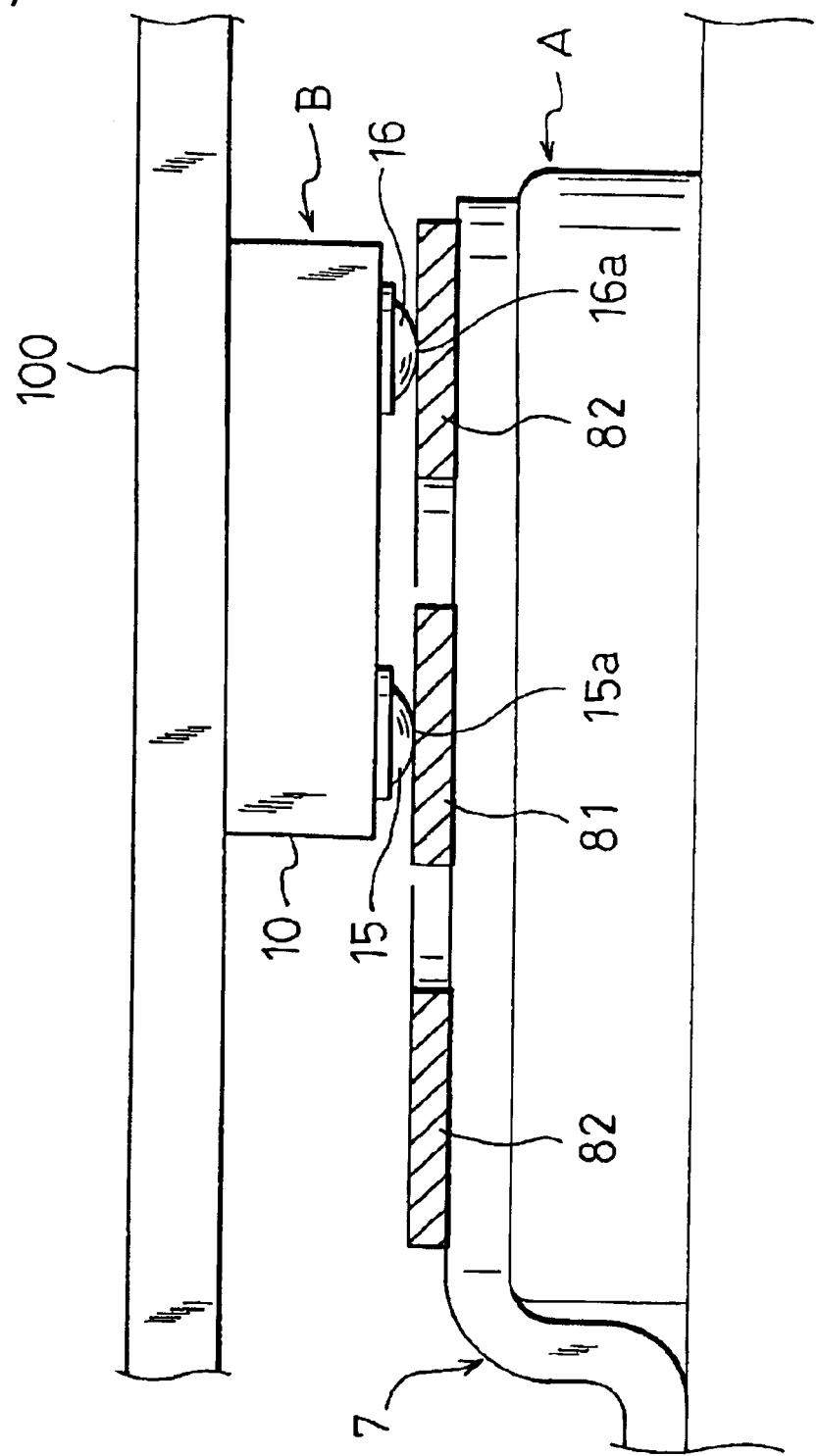
FIG. 15 is a schematic side view showing in a partially broken state the electric acoustic converter and still another connector.

FIG. 15 is a schematic side view showing in a partially broken state the electric acoustic converter A and still another connector B used in assemblage in the converter A.

The connector B of FIG. 15 allows the contact piece members 15 and 16 comprising a cubic body which is elastically energized in a projecting direction with an elastic body such as a coil spring or the like to be projected at two locations of the box case 10, and contact points provided on the tip portion of these contact piece members 15 and 16 are formed as electrodes 15a and 16a. This connector B allows the electrodes 15a and 16a to elastically come into contact with the two rear surface terminals 81 and 82 respectively as shown in FIG. 15 in the state in which the connector B is attached on the wiring substrate 100 on the side of the set of the communication device. In this case as well, a directivity is lost in the position relation between the two rear surface terminals 81 and 82 of the electric acoustic converter A and two electrodes 15a and 16a.

Figure 16:
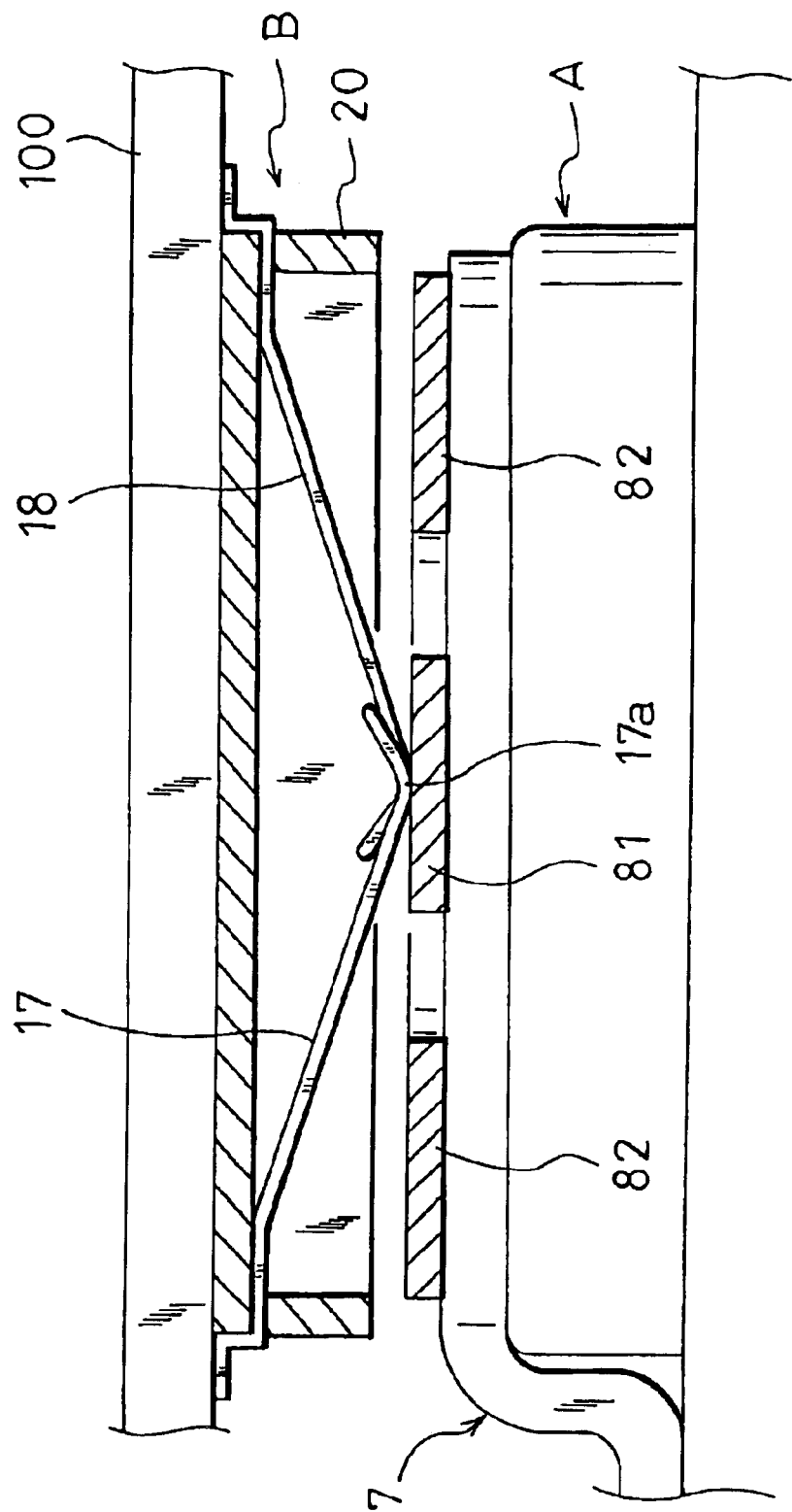
FIG. 16 is a schematic side view showing in a partially broken state the electric acoustic converter and still another connector.
Figure 17:
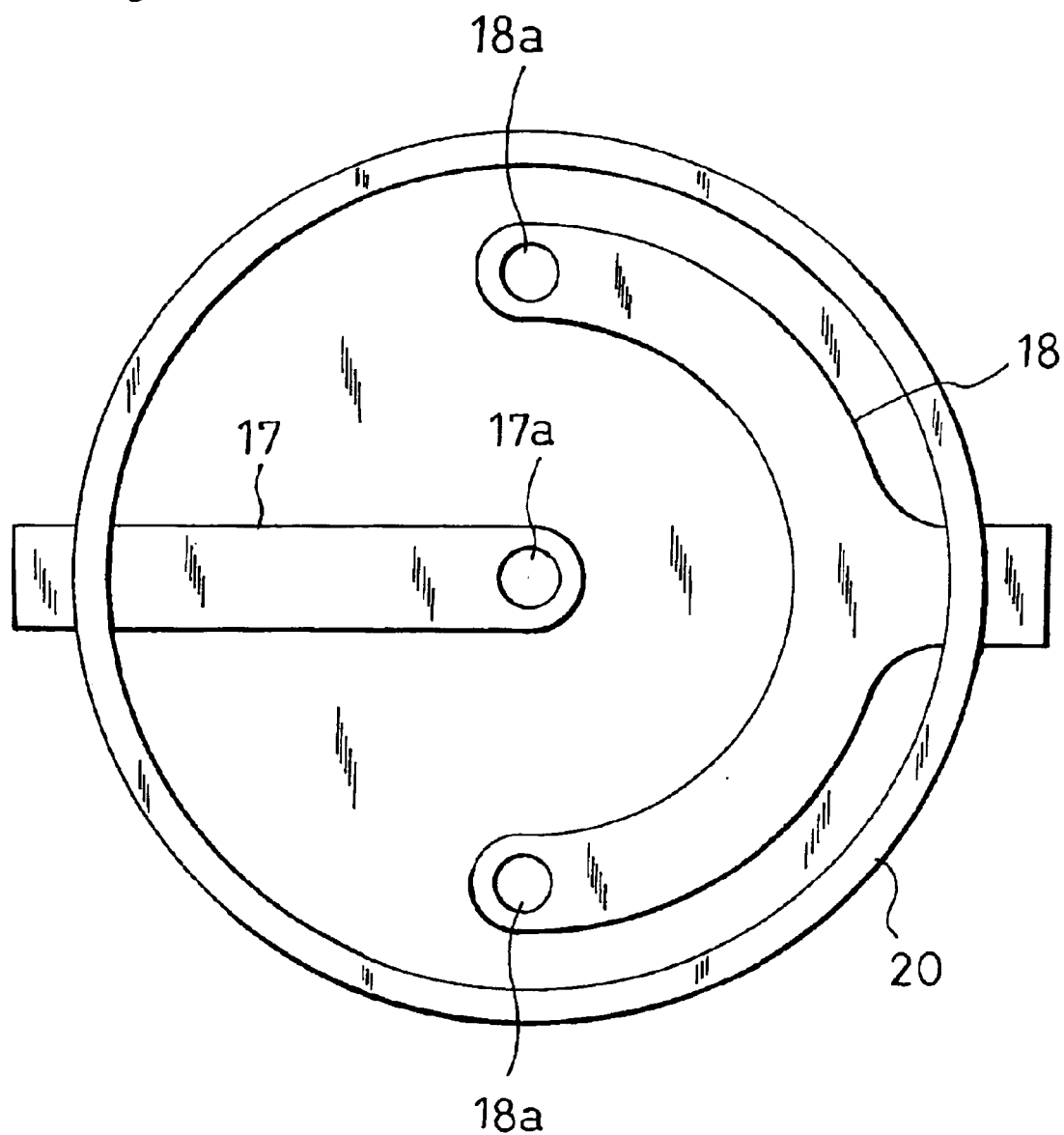
FIG. 17 is a plan view showing the connector of FIG. 16 as seen from below.

FIG. 16 is a schematic side view showing in a partially broken state the electric acoustic converter A and still another connector B used in assemblage in the electric acoustic converter A. FIG. 17 is a plan view showing the connector B as seen from below.

The connector B of FIG. 16 allows the plate piece-like contact piece member 17 and the arc-like contact piece member 18 to be projected in a state wherein they are opposite to each other inside the case 20, so that the contact points provided on each end portion of respective contact piece members 17 and 18 are formed as electrodes 17a and 18a. This connector B allows the electrodes 17a and 18a to elastically comes into contact with the two rear surface terminals 81 and 82 respectively as shown in FIG. 16 in the state in which the connector B is attached on the wiring substrate 100 on the side of the set of the communication device. In this case as well, a directivity is lost in the position relation between two rear surface terminals 81 and 82 of the electric acoustic converter A and two electrodes 17a and 18a.

In FIGS. 1 through 17, for simplification of the explanation, the same or the corresponding parts are denoted with the same reference numerals.

The entire disclosure of Japanese Patent Application No. 2000-173572 filed on Jun. 9, 2000 including specification, claims, drawings and summary are incorporated herein by reference in its entirety.

What is claimed is:

1. An electric acoustic converter having a rear surface terminal electrically connected to an end of a voice coil which is inserted into a gap of a magnetic circuit, comprising:
   a yoke which serves as a magnetic circuit constituent element having a rear surface at least a part of which is formed as a surface exposed to the outside to form a magnetic circuit; and said rear surface terminal arranged at a plurality of locations of the exposed surface to be electrically connected to an electrode on the side of a connector, the terminal being arranged at a plurality of locations of said exposed surface in a state in which said rear surface terminal is not extended out of the surface area of the exposed surface, wherein:

said rear surface terminal is formed of a surface electrode formed on a surface of a wiring substrate which is overlapped on said exposed surface, and said exposed surface and a recessed surface located at a position lower than the exposed surface at a location adjacent to the exposed surface are disposed on the rear surface of the yoke, said wiring substrate integrally comprises a projecting piece portion arranged on said recessed surface, and a soldering land formed on the surface of the projecting piece portion, which is electrically short-circuited to said rear surface terminal via a line connecting pattern formed on said wiring substrate while an end of said voice coil is soldered to the soldering land.

2. The electric acoustic converter having a rear surface terminal according to claim 1, wherein the rear surface of said yoke is formed in a flat surface circular configuration, said exposed surface is partitioned and formed on the central portion of the rear surface, and said recessed surface is partitioned and formed in a ring-shaped configuration on the periphery of the exposed surface.

3. The electric acoustic converter having a rear surface terminal according to claim 1, wherein:

the converter comprises two rear surface terminals and two soldering lands, said line connection patterns electrically short-circuiting the corresponding rear surface terminal and the soldering lands is formed on a rear surface of said wiring substrate, and the rear surface of the wiring substrate is joined with the rear surface of said yoke via a sticking layer.

4. The electric acoustic converter having a rear surface terminal according to claim 1, wherein:

a plurality of rear surface terminals arranged respectively on a plurality of locations of said exposed surface are formed of a surface electrode having a circular or a ring-shaped circular configuration which are mutually concentrically arranged.

5. The electric acoustic converter having a rear surface terminal according to claim 1, wherein:

the electrode on the side of the connector is formed of an end surface of the conductive rubber.

* * * * *